(12) United States Patent
Mottsmith et al.

(10) Patent No.: US 12,343,960 B2
(45) Date of Patent: *Jul. 1, 2025

(54) DURABLE GLASS FOR VEHICLE

(71) Applicant: TESLA, INC., Austin, TX (US)

(72) Inventors: Rosemary Mottsmith, Los Angeles, CA (US); Michael Pilliod, San Francisco, CA (US); William S. Sweney, Oakland, CA (US); Dante Lamastra, San Francisco, CA (US); Christos Gougoussis, Fremont, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,373

(22) Filed: Sep. 28, 2023

(65) Prior Publication Data

US 2024/0051270 A1      Feb. 15, 2024

Related U.S. Application Data

(60) Continuation of application No. 18/049,990, filed on Oct. 26, 2022, now Pat. No. 11,806,968, which is a
(Continued)

(51) Int. Cl.
  *B32B 17/10*    (2006.01)
  *B32B 7/12*     (2006.01)
  (Continued)

(52) U.S. Cl.
  CPC .......... *B32B 17/10137* (2013.01); *B32B 7/12* (2013.01); *B32B 17/10036* (2013.01);
  (Continued)

(58) Field of Classification Search
  None
  See application file for complete search history.

(56) References Cited

U.S. PATENT DOCUMENTS

| | | | |
|---|---|---|---|
| 11,511,523 B2 | 11/2022 | Mottsmith et al. |
| 11,806,968 B2 | 11/2023 | Mottsmith et al. |
| | (Continued) | | |

FOREIGN PATENT DOCUMENTS

| | | |
|---|---|---|
| CN | 114728504 | 7/2022 |
| DE | 4244048 | 6/1994 |
| | (Continued) | |

OTHER PUBLICATIONS

International Search Report and Written Opinion dated Feb. 17, 2021 in application No. PCT/US2020/061326.
(Continued)

*Primary Examiner* — Ramsey Zacharia
(74) *Attorney, Agent, or Firm* — Schwegman Lundberg & Woessner, P.A.

(57) ABSTRACT

A multilayer glass stack for a vehicle windshield with improved durability is described. The multilayer glass stack includes an external-facing glass layer, an internal-facing glass layer, and an adhesive interlayer positioned between the external-facing and internal-facing glass layers. The external-facing glass layer may include borosilicate and/or does not include soda lime glass. Methods of manufacturing the multilayer glass stack are also described.

26 Claims, 6 Drawing Sheets

Related U.S. Application Data division of application No. 16/952,910, filed on Nov. 19, 2020, now Pat. No. 11,511,523.

(60) Provisional application No. 62/938,776, filed on Nov. 21, 2019.

(51) Int. Cl.
*B32B 27/08* (2006.01)
*B32B 27/30* (2006.01)

(52) U.S. Cl.
CPC ........ *B32B 17/10899* (2013.01); *B32B 27/08* (2013.01); *B32B 27/30* (2013.01); *B32B 2250/03* (2013.01); *B32B 2250/04* (2013.01); *B32B 2250/05* (2013.01); *B32B 2250/40* (2013.01); *B32B 2307/102* (2013.01); *B32B 2307/4026* (2013.01); *B32B 2307/416* (2013.01); *B32B 2307/558* (2013.01); *B32B 2307/72* (2013.01); *B32B 2315/08* (2013.01); *B32B 2371/00* (2013.01); *B32B 2605/006* (2013.01)

(56) References Cited

U.S. PATENT DOCUMENTS

| | | | |
|---|---|---|---|
| 2003/0139520 | A1 | 7/2003 | Toyama et al. |
| 2010/0151210 | A1* | 6/2010 | Shimatani ......... B32B 17/10119 428/192 |
| 2011/0300356 | A1 | 12/2011 | Takamatsu et al. |
| 2015/0064428 | A1 | 3/2015 | Matsuo et al. |
| 2016/0243796 | A1* | 8/2016 | Mannheim Astete ....................... B32B 17/10348 |
| 2016/0257094 | A1 | 9/2016 | Lestringant et al. |
| 2018/0194114 | A1 | 7/2018 | Mannheim Astete et al. |
| 2018/0370843 | A1 | 12/2018 | Gross |
| 2019/0169068 | A1 | 6/2019 | Oya et al. |
| 2020/0230921 | A1* | 7/2020 | Yoshida ............ B32B 17/10633 |
| 2020/0254731 | A1 | 8/2020 | Mannheim et al. |
| 2021/0154980 | A1 | 5/2021 | Mottsmith et al. |
| 2023/0065805 | A1 | 3/2023 | Mottsmith et al. |

FOREIGN PATENT DOCUMENTS

| | | |
|---|---|---|
| DE | 20 2019 104803 U1 | 10/2019 |
| EP | 2 796 288 | 10/2014 |
| EP | 4061635 | 9/2022 |
| HK | 40068901 | 9/2022 |
| WO | WO 18/122769 | 7/2018 |
| WO | WO 18/178824 | 10/2018 |
| WO | WO 18/178882 | 10/2018 |
| WO | WO 18/178883 | 10/2018 |
| WO | WO 19/038723 | 2/2019 |
| WO | 2019064279 | 4/2019 |
| WO | WO 19/130285 | 7/2019 |
| WO | WO 19/151000 | 8/2019 |
| WO | 2021102163 | 5/2021 |

OTHER PUBLICATIONS

"U.S. Appl. No. 18/049,990, Non Final Office Action mailed Feb. 10, 2023", 10 pgs.
"U.S. Appl. No. 18/049,990, Response filed May 5, 2023 to Non Final Office Action mailed Feb. 10, 2023", 11 pgs.
"U.S. Appl. No. 18/049,990, Final Office Action mailed Jun. 8, 2023", 12 pgs.
"U.S. Appl. No. 18/049,990, Response filed Jul. 11, 2023 to Final Office Action mailed Jun. 8, 2023", 9 pgs.
"U.S. Appl. No. 18/049,990, Notice of Allowance mailed Jul. 25, 2023", 7 pgs.
"U.S. Appl. No. 16/952,910, Restriction Requirement mailed Oct. 29, 2021", 6 pgs.
"U.S. Appl. No. 16/952,910, Response filed Feb. 25, 2022 to Restriction Requirement mailed Oct. 29, 2021", 6 pgs.
"U.S. Appl. No. 16/952,910, Non Final Office Action mailed Mar. 15, 2022", 11 pgs.
"U.S. Appl. No. 16/952,910, Response filed Jun. 14, 2022 to Non Final Office Action mailed Mar. 15, 2022", 11 pgs.
"U.S. Appl. No. 16/952,910, Notice of Allowance mailed Jul. 28, 2022", 9 pgs.
"U.S. Appl. No. 16/952,910, Supplemental Notice of Allowability mailed Aug. 3, 2022", 2 pgs.
"International Application Serial No. PCT US2020 061326, International Search Report mailed Feb. 17, 2021", 7 pgs.
"International Application Serial No. PCT US2020 061326, Written Opinion mailed Feb. 17, 2021", 8 pgs.
"International Application Serial No. PCT US2020 061326, International Preliminary Report on Patentability mailed Jun. 2, 2022", 10 pgs.
"Response Application Serial No. 20824833.6, Response to Communication pursuant to Rules 161(1) and 162 EPC filed Jan. 4, 2023", 52 pgs.
"European Application Serial No. 20824833.6, Communication Pursuant to Article 94(3) EPC mailed Sep. 4, 2024", 5 pgs.
"Japanese Application Serial No. 2022-529296, Notification of Reasons for Refusal mailed Dec. 10, 2024", w English Translation, 6 pgs.
"European Application Serial No. 20824833.6, Response Filed Jan. 2, 2025 to Communication Pursuant to Article 94(3) EPC mailed Sep. 4, 2024", 48 pgs.
"Chinese Application Serial No. 202080080726.4, Response filed Feb. 28, 2025 to Office Action mailed Oct. 31, 2024", W English Claims, 13 pgs.

* cited by examiner

DURABLE GLASS FOR VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application is a continuation of U.S. patent application Ser. No. 18/049,990, filed Oct. 26, 2022, which is a divisional of U.S. patent application Ser. No. 16/952,910, filed Nov. 19, 2020, which claims priority pursuant to 35 U.S.C. § 119(e) to U.S. Provisional Application No. 62/938,776, filed Nov. 21, 2019, which are hereby incorporated herein by reference in their entirety and made part of the present U.S. Utility patent application for all purposes.

BACKGROUND

Field

The present disclosure relates to vehicle windshields. More specifically, the present disclosure relates to multilayer glass stack structures for vehicle windshields with improved durability.

Description of the Related Art

Vehicles, such as automotive vehicles, typically use durable glass for various components, such as the front, side, rear and roof windows or windshields, headlamps, and other vehicle components. Such glass components can be subject to external forces, which, if high enough, can cause chipping, cracking or other damage to the glass.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

In one aspect, a glass structure for a vehicle includes a durable glass stack. The stack includes three layers: an outer (i.e. external-facing) layer, an inner (i.e. internal-facing) layer, and an adhesive interlayer between the outer layer and inner layer. The outer layer includes non-soda lime, low-CTE, high densification glass. In some embodiments, the outer layer is between about 2 mm and about 5 mm thick. The inner layer includes a thin, chemically strengthened glass with high strength and flexibility. In some embodiments, the inner layer is between about 0.5 mm and about 1.1 mm thick. The adhesive interlayer material has energy absorptive properties and a glass transition temperature outside the zone of normal operating conditions. The materials in the layers of the stack may be tuned for desired durability.

In one aspect, a multilayer glass stack for a vehicle windshield is described. The multilayer glass stack includes an external-facing glass layer comprising borosilicate, an internal-facing glass layer, and an adhesive interlayer positioned between the external-facing and internal-facing glass layers, wherein the adhesive interlayer comprises an adhesive, wherein the multilayer glass stack is a vehicle windshield and is shaped to fit into a vehicle windshield frame.

In some embodiments, the multilayer glass stack has an area density of about 7.5 kg/m$^2$ to about 10 kg/m$^2$. In some embodiments, the multilayer glass stack has at most a 10% chance of failure with an impact of 2 J. In some embodiments, the vehicle windshield is selected from the group consisting of a front windshield, a side windshield, a back windshield, a top windshield, and combinations thereof.

In some embodiments, the external-facing glass layer has at most a 10% chance of failure with an impact of 2 J. In some embodiments, the external-facing glass layer has a thickness of about 2 mm to about 5 mm. In some embodiments, the external-facing glass layer is an outermost layer of the multilayer glass stack. In some embodiments, the external-facing glass layer is shatter resistant or shatterproof. In some embodiments, the external-facing glass layer resistant to crack initiation and crack propagation. In some embodiments, the external-facing glass layer does not comprise soda lime glass.

In some embodiments, the internal-facing glass layer comprises a material selected from the group consisting of aluminosilicate, tempered glass, and combinations thereof. In some embodiments, the internal-facing glass layer has a thickness of about 0.5 mm to about 1.1 mm. In some embodiments, the internal-facing glass layer is an outermost layer of the multilayer glass stack. In some embodiments, a thickness ratio of the external-facing glass layer:internal-facing glass layer is greater than 1:1. In some embodiments, the thickness ratio of the external-facing glass layer:internal-facing glass layer is greater than 1:1 to about 10:1.

In some embodiments, the adhesive interlayer has energy absorptive properties. In some embodiments, the adhesive interlayer has a glass transition temperature of about 6° C. to about 10° C. In some embodiments, the adhesive interlayer comprises multiple layers. In some embodiments, the adhesive comprises a polyvinyl ether (PVE).

In some embodiments, the multilayer glass stack further comprises at least one additional layer, wherein the at least one additional layer is selected from the group consisting of a light absorbing layer, a light reflecting layer, an acoustic dampening layer, and combinations thereof. In some embodiments, the at least one additional layer comprises a light absorbing layer, and the light absorbing layer comprises a tint material. In some embodiments, the multilayer glass stack further comprises an element selected from the group consisting of a camera, a sensor, a heating element, a waveguide, an incoupling optical element, an outcoupling optical element, a light injection device, and combinations thereof. In some embodiments, the vehicle windshield has a curvilinear shape. In some embodiments, the vehicle windshield is configured to break into small pieces.

In another aspect, a vehicle comprising a vehicle frame and the multilayer glass stack is described. In some embodiments, the vehicle further comprises an electric motor. In some embodiments, the vehicle further comprises a camera positioned facing the internal-facing glass layer of the multilayer glass stack. In some embodiments, the multilayer glass stack further comprises a camera viewing area, wherein the camera is positioned to view through the camera viewing area of the multilayer glass stack, and wherein the camera viewing area has an optical distortion of less than about 250 millidiopters.

In another aspect, a method of manufacturing a multilayer glass stack is described. The method includes forming an external-facing glass layer comprising borosilicate, forming an internal-facing glass layer, forming an adhesive interlayer comprising an adhesive, and positioning the adhesive interlayer between the external-facing and internal-facing glass layers to form a multilayer glass stack.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of embodiments.

Embodiments relate to stacked glass structures or multilayer glass stacks that may be used in vehicles, for example, as a windshield. Embodiments of the stacked glass structures disclosed are capable of providing increased durability relative to conventional vehicle glass structures, such as single panes of glass, or multiple layers of glass made from conventional glass and adhesive materials. Some embodiments can include one or more layers of borosilicate glass and provide increased durability, while also being formable into more complex, curvilinear shapes, such as a vehicle windshield or other vehicle component. In one embodiment, the glass is a multilayer glass with an inner glass layer, an adhesive layer, and an outer layer of borosilicate glass. Some embodiments can provide increased transparency, which can also be beneficial within a vehicle implementation. In some embodiments, the multilayer glass stack provides enhanced damage tolerance, including preventing or decreasing crack initiation and/or the propagation of cracks.

Additional advantages of such improved multilayer glass stacks include improved customer experience (as the need to replace windshields or other glass components due to glass damage or breakage is reduced or eliminated), greater technology integration into glass components, decreased costs, improved sustainability, decreased waste, improved sharp-object impact resistance (e.g. from sharp-objects such as sharp rocks getting kicked up by larger trucks on the highway), improved blunt-object impact resistance such as damage to glass by flexing the glass and putting the opposite side (generally the inner ply) in tension (e.g. from both small and large blunt impactors such as small smooth rocks kicked up on the highway, or human impacts such as pedestrian impacts and/or vehicle occupant impacts in accidents, including elbows impacting window glass when entering/exiting the vehicle), improved scratch resistance which may further prevent glass breakage through activation of preexisting scratches or flaws (e.g. from improper handling during shipping or manufacturing, contact with driver/passenger objects such as keys, jewelry, and/or cleaning), improved pitting resistance that may occur with exposure to impacts with energy too low to cause cracking, (e.g. impacts or forced contact with small gravel or sand can cause micro-indentations or flaws in the glass surface that do not propagate into the thickness enough to cause a visible crack, which may cause the surface of the glass becomes hazy due to the cumulative effect of the micro damage), improved thermal cycling that may cause both crack generation and crack propagation (e.g. relatively small changes in temperature may cause an existing crack or flaw to propagate, wherein all materials have a coefficient of thermal expansion (CTE) and materials with higher CTE will expand and contract more with temperature changes), and humidity and/or moisture resistance where the presence of moisture at the crack tip may significantly increase the rate of crack propagation in glass (e.g. soda lime glass).

Figure 1:
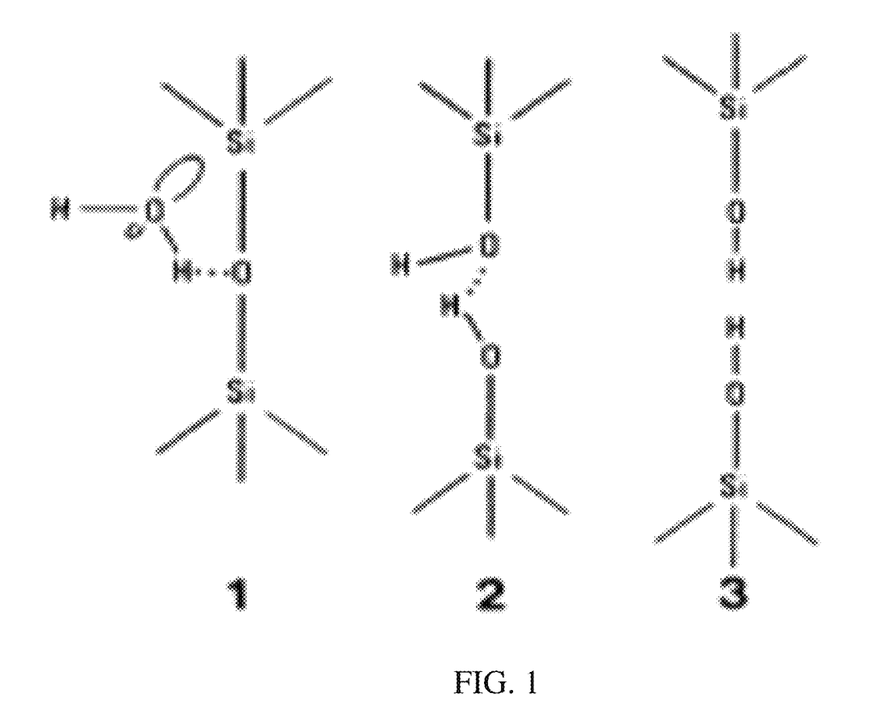
FIG. 1 illustrates the chemical steps in a siloxane bond breakage process, which is a mechanism that may occur in a glass material.

For example, a mechanism for crack propagation in conventional glass (e.g. soda lime glass) is shown in FIG. 1. FIG. 1 illustrates a siloxane bond breakage mechanism that may in part be caused by water. Such siloxane bond breakages may result in crack propagation, and may manifest in automotive glass when a small edge crack or crack caused by an impact (e.g. a rock chip) grows across a windshield after rain or when condensation is present. Embodiments herein may reduce these effects by using a borosilicate glass layer at the outer layer of glass which would be impacted by a strike from a road object.

Figure 2:
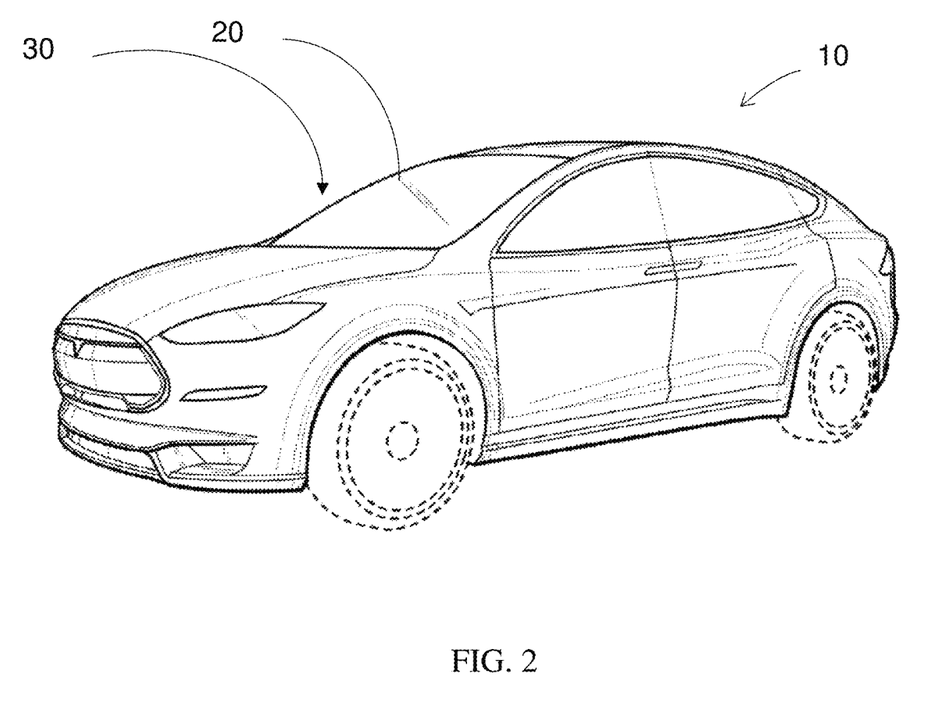
FIG. 2 illustrates a perspective view of one example of a front windshield on a vehicle with a multilayer glass stack according to some embodiments.

FIG. 2 illustrates an example of a vehicle 10 with a multilayer glass stack 20 implemented in a front windshield 30. In some embodiments, the windshield may be a front windshield, a side windshield, a rear windshield, a top or roof windshield (e.g. a sunroof or moonroof), headlamps or headlights, and combinations thereof. In some embodiments, the windshield is a front windshield, a side windshield, a back windshield, a top windshield, and combinations thereof. In some embodiments, the vehicle windshield has a curvilinear shape. In some embodiments, the multilayer glass stack is shaped to fit into a vehicle windshield frame. In some embodiments, the vehicle windshield is configured to break into small pieces to comply with governmental safety guidelines. In some embodiments, the vehicle comprises a vehicle frame. In some embodiments, the vehicle comprises an electric motor.

Multilayer Glass Stack

Figure 3:
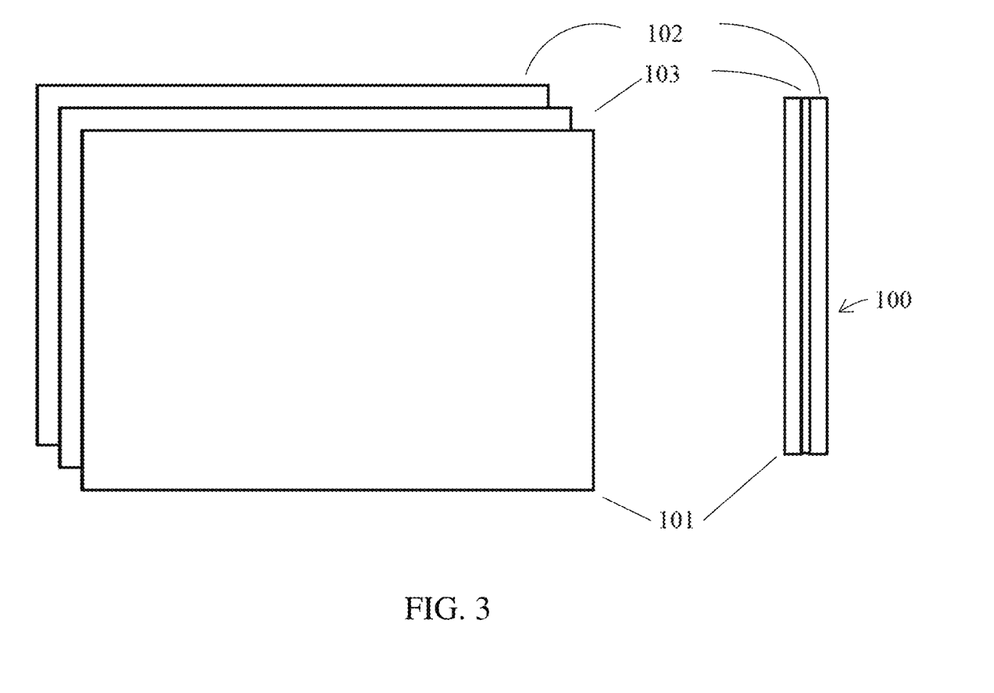
FIG. 3 illustrates an example of a multilayer glass stack according to some embodiments.

FIG. 3 illustrates an example of a multilayer glass stack 100 in an exploded view and a side view. The multilayer glass stack 100 includes an outer layer of borosilicate glass (i.e. external-facing glass layer) 101 and an inner layer of glass (i.e. internal-facing glass layer) 102. An adhesive interlayer 103 is positioned between the outer layer of glass 101 and the inner layer of glass 103. The multilayer glass stack 100 may comprise one or more additional layers of glass and adhesive. It is to be understood that each of the layers of glass within stack 100 may each include one or more layers or laminations. The orientation of the layers can be reversed (for example, outer layer may be reversed to face the inside of a vehicle, and the inner layer may be reversed to face the outside of a vehicle). Additionally, the materials in the layers of the stack may be tuned for desired durability. The materials described herein can be implemented in various combinations, and it will be understood that any of the three layers 101, 102 and 103 can comprise, consist essentially of, or consist of the materials herein, even where only described as "comprise."

In some embodiments, the multilayer glass stack includes an external-facing layer of borosilicate glass, an adhesive interlayer, and an internal-facing layer of borosilicate glass. In these embodiments, the adhesive layer may be, for example, polyvinyl ether (PVE). In some embodiments, the multilayer glass stack includes an external-facing layer of borosilicate glass, an adhesive interlayer, and an internal-facing layer of aluminosilicate glass. In some embodiments, the multilayer glass stack includes an external-facing layer of borosilicate glass, an adhesive interlayer, and an internal-facing layer of tempered glass.

In some embodiments, the multilayer glass stack includes an external-facing layer of borosilicate glass, an adhesive interlayer, and an internal-facing layer comprising borosilicate glass and aluminosilicate glass. In some embodiments, the multilayer glass stack includes an external-facing layer of borosilicate glass, an adhesive interlayer, and an internal-facing layer of borosilicate glass and tempered glass. In some embodiments, the multilayer glass stack includes an external-facing layer of borosilicate glass, an adhesive interlayer, and an internal-facing layer made of aluminosilicate glass and tempered glass.

In some embodiments, the multilayer glass stack includes an external-facing layer of borosilicate glass, a first adhesive interlayer, one or more borosilicate glass interlayers, a second adhesive interlayer, and an internal-facing layer of borosilicate glass, in the order recited. In some embodiments, the multilayer glass stack includes an external-facing layer of borosilicate glass, a first adhesive interlayer, one or more borosilicate glass interlayers, a second adhesive interlayer, and an internal-facing layer of aluminosilicate glass, in the order recited. In some embodiments, the multilayer glass stack includes an external-facing layer of borosilicate glass, a first adhesive interlayer, one or more borosilicate glass interlayers, a second adhesive interlayer, and an internal-facing layer of tempered glass, in the order recited.

In some embodiments, the multilayer glass stack includes an external-facing layer of borosilicate glass, a first adhesive interlayer, one or more borosilicate glass interlayers, a second adhesive interlayer, and an internal-facing layer comprising borosilicate glass and aluminosilicate glass, in the order recited. In some embodiments, the multilayer glass stack includes an external-facing layer of borosilicate glass, a first adhesive interlayer, one or more borosilicate glass interlayers, a second adhesive interlayer, and an internal-facing layer of borosilicate glass and tempered glass, in the order recited. In some embodiments, the multilayer glass stack includes an external-facing layer of borosilicate glass, a first adhesive interlayer, one or more borosilicate glass interlayers, a second adhesive interlayer, and an internal-facing layer made of aluminosilicate glass and tempered glass, in the order recited.

In some embodiments, the multilayer glass stack includes an external-facing layer of borosilicate glass, a first adhesive interlayer, one or more borosilicate glass and aluminosilicate glass interlayers, a second adhesive interlayer, and an internal-facing layer of borosilicate glass, in the order recited. In some embodiments, the multilayer glass stack includes an external-facing layer of borosilicate glass, a first adhesive interlayer, one or more borosilicate glass and tempered glass interlayers, a second adhesive interlayer, and an internal-facing layer of aluminosilicate glass, in the order recited. In some embodiments, the multilayer glass stack includes an external-facing layer of borosilicate glass, a first adhesive interlayer, one or more aluminosilicate glass and tempered glass interlayers, a second adhesive interlayer, and an internal-facing layer of tempered glass, in the order recited.

In some embodiments, the multilayer glass stack includes an external-facing layer of borosilicate glass, a first adhesive interlayer, one or more borosilicate glass and aluminosilicate glass interlayers, a second adhesive interlayer, and an internal-facing layer comprising borosilicate glass and aluminosilicate glass, in the order recited. In some embodiments, the multilayer glass stack includes an external-facing layer of borosilicate glass, a first adhesive interlayer, one or more borosilicate glass and tempered glass interlayers, a second adhesive interlayer, and an internal-facing layer of borosilicate glass and tempered glass, in the order recited. In some embodiments, the multilayer glass stack includes an external-facing layer of borosilicate glass, a first adhesive interlayer one or more aluminosilicate glass and tempered glass interlayers, a second adhesive interlayer, and an internal-facing layer of aluminosilicate glass and tempered glass, in the order recited.

In some embodiments, the multilayer glass stack includes, includes at least, or includes at most, 3, 4, 5, 6, 7, 8, 9, 10, 11, 12, 13, 14, 15, 16, 17, 18, 19 or 20 layers of material, or any range of values therebetween. In some embodiments, the multilayer glass stack includes, includes at least, or includes at most, 2, 3, 4, 5, 6, 7, 8, 9, 10, 11, 12, 13, 14, 15, 16, 17, 18, 19 or 20 glass layers, or any range of values therebetween. In some embodiments, at least one layer of the multilayer glass stack does not comprise or is absent of soda lime glass. In some embodiments, all layers of the multilayer glass stack do not comprise or are absent of soda lime glass.

In some embodiments, the multilayer glass stack has at most a, or about a, 10% chance of failure with an impact of, or of about, 1 J, 1.5 J, 2 J, 2.5 J, 3 J, 3.2 J, 3.5 J, 3.8 J, 3.9 J, 4 J, 4.5 J, 5 J or 6 J, or any range of values therebetween. In some embodiments, the multilayer glass stack has at most a, or about a, 1%, 2%, 3%, 4%, 5%, 6%, 8%, 10%, 15%, 20%, 25%, 30%, 40%, 50%, 60% or 70% chance of failure, or any range of values therebetween, with an impact of, or of about, 3 J. In some embodiments, the multilayer glass stack has a curvilinear shape. In some embodiments, the multilayer glass stack is configured to break into small pieces. In some embodiments, the multilayer glass stack may further comprise various suitable materials with various characteristics to provide one or more of the benefits described herein.

In some embodiments, the multilayer glass stack has a thickness of, of about, of at most, or of at most about, 0.5 mm, 1 mm, 2 mm, 3 mm, 4 mm, 5 mm, 6 mm, 7 mm, 8 mm, 9 mm, 10 mm, 15 mm, 20 mm, 25 mm, 30 mm, 40 mm, 50 mm, 60 mm, 70 mm, 80 mm, 90 mm, 100 mm, 120 mm, 140 mm, 160 mm, 180 mm, 200 mm, 225 mm, 250 mm, 300 mm or 500 mm, or any range of values therebetween. In some embodiments, the multilayer glass stack has an area density of, of about, of at most, or of at most about, 1 kg/m$^2$, 2 kg/m$^2$, 3 kg/m$^2$, 4 kg/m$^2$, 5 kg/m$^2$, 5.5 kg/m$^2$, 6 kg/m$^2$, 6.5 kg/m$^2$, 7 kg/m$^2$, 7.5 kg/m$^2$, 8 kg/m$^2$, 8.5 kg/m$^2$, 9 kg/m$^2$, 9.5 kg/m$^2$, 10 kg/m$^2$, 11 kg/m$^2$, 12 kg/m$^2$, 13 kg/m$^2$, 15 kg/m$^2$, 20 kg/m$^2$, 25 kg/m$^2$ or 50 kg/m$^2$, or any range of values therebetween.

External-Facing Glass Layer

The external-facing glass layer includes a glass that is robust to damage, for example damage from sharp object impacts, scratches and pitting. In some embodiments, the external-facing glass layer may be shatterproof, shatter resistant, chemically treated to provide further increased hardness and durability, or combinations thereof. In some embodiments, the external-facing glass layer is shatter resistant or shatterproof. In some embodiments, the external-facing glass layer resistant to crack initiation and crack propagation. In some embodiments, the external-facing glass layer when cracked forms, or is likely to form, cone shaped cracks. Cone shaped cracks may aid the layer to arrest crack propagation, especially in relation to radial cracks known to form in other materials such as soda lime glass. In some embodiments, the external-facing glass layer is an outermost or innermost layer of the multilayer glass stack.

In some embodiments, the external-facing glass layer comprises a material comprising a metal. In some embodiment, the metal is selected from boron, silicon and combinations thereof. In some embodiments, the material is a transparent material. In some embodiments, the material is borosilicate glass. In some embodiments, the external-facing glass layer does not include or comprise soda lime glass. In some embodiments, the external-facing glass layer comprises no soda lime glass. In some embodiments, the soda lime free chemistry allows the external-facing glass layer to be less susceptible to the chemical breakdown of bonds that results in humidity-induced cracking in glass. As with resistance to thermal cycling, humidity-resistance can prevent crack growth from preexisting cracks and flaws, preventing the need for glass replacement.

The external-facing glass layer may include a high densification glass relative to conventional windshield glasses. Such increased densification of the external-facing glass layer (e.g. comprising borosilicate glass) relative to low densification glass (e.g. soda lime glass) may improve scratching and pitting resistances. In some embodiment, the external-facing glass layer has a density of, of about, of at least, or of at least about 1 g/cm$^3$, 1.5 g/cm$^3$, 1.75 g/cm$^3$, 2 g/cm$^3$, 2.25 g/cm$^3$, 2.5 g/cm$^3$, 2.75 g/cm$^3$, 3 g/cm$^3$, 3.5 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, or any range of values therebetween. In some embodiment, the external-facing glass layer has a hardness of, of about, of at least, or of at least about 3 Mohs, 4 Mohs, 4.2 Mohs, 4.4 Mohs, 4.6 Mohs, 4.8 Mohs, 5 Mohs, 5.1 Mohs, 5.2 Mohs, 5.3 Mohs, 5.4 Mohs, 5.5 Mohs, 5.6 Mohs, 5.7 Mohs, 5.8 Mohs, 5.9 Mohs, 6 Mohs, 6.2 Mohs, 6.4 Mohs, 6.6 Mohs, 6.8 Mohs, 7 Mohs or 8 Mohs, or any range of values therebetween. In some embodiment, the external-facing glass layer has at most a, or about a, 10% chance of failure with an impact of, or of about, 1 J, 1.5 J, 2 J, 2.5 J, 3 J, 3.2 J, 3.5 J, 3.8 J, 3.9 J, 4 J, 4.5 J, 5 J or 6 J, or any range of values therebetween. In some embodiment, the external-facing glass layer has at most a, or about a, 1%, 2%, 3%, 4%, 5%, 6%, 8%, 10%, 15%, 20%, 25%, 30%, 40%, 50%, 60% or 70% chance of failure, or any range of values therebetween, with an impact of, or of about, 3 J. In some embodiments, the external-facing glass layer has a thickness of, of about, of at most, or of at most about, 0.5 mm, 1 mm, 2 mm, 3 mm, 4 mm, 5 mm, 6 mm, 8 mm, 7 mm, 8 mm, 9 mm, 10 mm, 12 mm, 15 mm, 18 mm or 20 mm, or any range of values therebetween.

The external-facing glass layer may include a low coefficient of thermal expansion (low CTE) glass relative to conventional windshield glasses. A low CTE glass effectively causes a glass to be less sensitive to thermal cycling crack growth. Therefore, even if a glass is more robust to impacts, it may still be damaged or flawed. However, in the event that the glass is flawed or cracked, a low CTE glass is less likely to grow or expand the damage due to stresses from temperature changes. In the U.S., the legal requirement is that cracks in a windshield must not be greater than 12 mm. The legal requirements regarding crack size and replacement is often for commercial trucks, although some jurisdictions have crack requirements for passenger and other vehicles. So even if the glass is cracked by a rock, a low-CTE glass may prevent cracks or flaws from expanding to sizes that legally require a windshield replacement. In some embodiments, the external-facing glass layer has a coefficient of thermal expansion (CTE) at 20° C. of, of about, of at most, or of at most about, $1 \times 10^{-6}$ K$^{-1}$, $1.5 \times 10^{-6}$ K$^{-1}$, $2 \times 10^{-6}$ K$^{-1}$, $2.2 \times 10^{-6}$ K$^{-1}$, $2.4 \times 10^{-6}$ K$^{-1}$, $2.6 \times 10^{-6}$ K$^{-1}$, $2.8 \times 10^{-6}$ K$^{-1}$, $3 \times 10^{-6}$ K$^{-1}$, $3.2 \times 10^{-6}$ K$^{-1}$, $3.4 \times 10^{-6}$ K$^{-1}$, $3.6 \times 10^{-6}$ K$^{-1}$, $3.8 \times 10^{-6}$ K$^{-1}$, $4 \times 10^{-6}$ K$^{-1}$, $4.5 \times 10^{-6}$ K$^{-1}$ or $5 \times 10^{-6}$ K$^{-1}$, or any range of values therebetween.

It was found that multilayer glass stacks with an external-facing borosilicate glass layer result in glass stacks with improved impact resistance relative to conventional glass stacks, such as conventional glass stacks used for vehicle windshields that do not include borosilicate glass. In some embodiments, multilayer glass stacks with an external-facing borosilicate glass layer result in glass stacks with 2, 3, 4, 5, 6, 7, 8, 9, 10, 12, 15 or 20 times improved impact resistance relative to conventional glass stacks, such as conventional glass stacks used for vehicle windshields that do not include borosilicate glass.

Internal-Facing Glass Layer

The internal-facing glass layer includes a glass that is thin, flexible and/or strong, which allows for more of the impact energy to be dissipated in flexure rather than through fracture. In some embodiments, the internal-facing glass layer is an outermost or innermost layer of the multilayer glass stack.

In some embodiments, the internal-facing glass layer may comprise the same, or different, material than the external-facing glass layer. For example, in some embodiments the internal-facing glass layer may have the same, or different, chemical composition, strength, hardness, and/or flexibility as the external-facing glass layer. In some embodiments, the internal-facing glass layer comprises a material selected from the group consisting of borosilicate, aluminosilicate, tempered glass, and combinations thereof. In some embodiments, the internal-facing glass layer comprises a material selected from the group consisting of aluminosilicate, tempered glass, and combinations thereof.

In some embodiments, the internal-facing glass layer is chemically strengthened. Chemical strengthening of glass creates a compression layer on the surface of the glass, which makes the glass much more difficult to scratch or otherwise damage. Because blunt-object impacts activate flaws on the opposite surface of the glass, chemically strengthening the internal-facing glass layer may reduce the likelihood of failure from flaw activation from impacts. In some embodiments, the internal-facing glass layer may be shatterproof, shatter resistant, or chemically treated to provide further increased hardness and durability.

In some embodiment, the internal-facing glass layer has at most a, or about a, 10% chance of failure with an impact of, or of about, 1 J, 1.5 J, 2 J, 2.5 J, 3 J, 3.2 J, 3.5 J, 3.8 J, 3.9 J, 4 J, 4.5 J, 5 J or 6 J, or any range of values therebetween. In some embodiment, the internal-facing glass layer has at most a, or about a, 1%, 2%, 3%, 4%, 5%, 6%, 8%, 10%, 15%, 20%, 25%, 30%, 40%, 50%, 60% or 70% chance of failure, or any range of values therebetween, with an impact of, or of about, 3 J.

In some embodiments, the internal-facing glass layer has a thickness of, of about, of at most, or of at most about, 0.1 mm, 0.2 mm, 0.3 mm, 0.4 mm, 0.5 mm, 0.6 mm, 0.8 mm, 1 mm, 1.1 mm, 1.2 mm, 1.5 mm, 2 mm, 3 mm, 4 mm, 5 mm, 6 mm, 8 mm, 7 mm, 8 mm, 9 mm, 10 mm or 12 mm, or any range of values therebetween. In some embodiments, the internal-facing glass layer is the same or a different thickness than the external-facing glass layer. In some embodiments, the internal-facing glass layer is thicker than the internal-facing glass layer. In some embodiments, the internal-facing glass layer is thinner than the internal-facing glass layer. In some embodiments, a thickness ratio of the external-facing glass layer:internal-facing glass layer is, is about, is less than, is less than about, is at most, is at most about, is greater than, is greater than about, is at least, or is at least about, 1:10, 1:5, 1:2, 1:1, 2:1, 3:1, 4:1, 5:1, 6:1, 7:1, 8:1, 9:1, 10:1, 12:1, 15:1, 20:1, 40:1, or any range of values therebetween.

Adhesive Interlayer

The adhesive interlayer may be positioned between the external-facing glass layer and the internal-facing glass layer. In some embodiments, the adhesive interlayer comprises an interlayer material. In some embodiments, the interlayer material comprises an adhesive. In some embodiments, the adhesive comprises a polyvinyl ether (PVE). In some embodiments, the adhesive interlayer comprises multiple layers.

In some embodiments, the adhesive interlayer has energy absorptive properties. In some embodiments, the interlayer material has energy absorptive properties. In some embodiments, the interlayer material has a glass transition temperature (Tg) outside the zone of normal operating conditions for a vehicle. In some embodiments, the interlayer material may prevent brittleness that is typical in conventional vehicle glasses. Selecting an interlayer material with high energy absorption may aid in limiting breakage from both blunt and sharp impacts. Impact energy must be dissipated by a combination of flexure and fracture (and heat and sound) in order to avoid damage to the glass layers. Therefore, the more energy can be absorbed by the interlayer the less will be transferred to the external-facing and internal-facing glass layers. Furthermore, a low glass transition temperature (Tg) will aid in the performance of the glass uniform in all driving environments. Above the Tg, the interlayer is flexible, and below Tg it becomes brittle and less able to dissipate impact energy. However, typical vehicles spend an average of 10% of miles driven below the Tg of the traditional interlayer material. As such, a low-Tg interlayer solution would ensure that performance is uniform across all operating temperatures and does not have additional breakages in cold weather. In some embodiments, the adhesive interlayer has a glass transition temperature of, of about, of at least, of at least about, of at most, or of at most about 1° C., 2° C., 3° C., 4° C., 5° C., 6° C., 7° C., 8° C., 9° C., 10° C., 11° C., 12° C., 15° C. or 20° C., or any range of values therebetween.

Furthermore, decorations on glass layers introduce weak points in a glass stack. For example, the black frit used on the edges of automotive glass stacks creates stress on the glass surface that weakens the stack. To remove this stress and create a more durable glass stack, the decorations may be added into the adhesive interlayer. In some embodiments, the interlayer material comprises a decoration. In some embodiments, a decoration is printed on the adhesive interlayer.

Additional Layers and Elements

The multilayer glass stack may include additional layers and/or elements integrated into the multilayer glass stack. In some embodiments, the multilayer glass stack further comprises, or comprises at least, 1, 2, 3, 4, 5, 6, 7, 8, 9, 10, 11, 12, 13, 14, 15, 16, 17, 18, 19 or 20 additional layer(s), or any range of values therebetween. In some embodiments, the additional layer is an additional interlayer. In some embodiments, the at least one additional layer is selected from the group consisting of a glass layer, an adhesive layer, a light absorbing layer, a light reflecting layer, an acoustic dampening layer, and combinations thereof. In some embodiments, the light absorbing layer comprises a tint material. In some embodiments, the multilayer glass stack further comprises, or comprises at least, 1, 2, 3, 4, 5, 6, 7, 8, 9, 10, 11, 12, 13, 14, 15, 16, 17, 18, 19 or 20 element(s), or any range of values therebetween. In some embodiments, the multilayer glass stack further comprises an element selected from the group consisting of a camera, a sensor, a heating element, a waveguide, an incoupling optical element, an outcoupling optical element, a light injection device, and combinations thereof. In some embodiments, an element is positioned or disposed on or over the external-facing layer, the internal-facing layer, or between the external-facing and internal facing layers.

In some embodiments, the element is a camera. In some embodiments, the multilayer glass stack comprises a camera viewing area. In some embodiments, the camera viewing area has an optical distortion (e.g. average optical distortion in millidiopters-mdpt) of, of about, at most, or at most about, 1 mdpt, 5 mdpt, 10 mdpt, 50 mdpt, 75 mdpt, 100 mdpt, 125 mdpt, 150 mdpt, 175 mdpt, 200 mdpt, 225 mdpt, 250 mdpt, 275 mdpt, 300 mdpt, 325 mdpt, 350 mdpt, 400 mdpt, 500 mdpt, 600 mdpt, 700 mdpt, 800 mdpt or 1000 mdpt, or any range of values therebetween. In some embodiments, the camera viewing area is, is about, is at most, is at most about, is at least, or is at least about, 0.1 $cm^2$, 0.5 $cm^2$, 1 $cm^2$, 2 $cm^2$, 3 $cm^2$, 4 $cm^2$, 5 $cm^2$, 6 $cm^2$, 7 $cm^2$, 8 $cm^2$, 9 $cm^2$, 10 $cm^2$, 15 $cm^2$, 20 $cm^2$, 25 $cm^2$, 30 $cm^2$, 40 $cm^2$, 50 $cm^2$, 60 $cm^2$, 80 $cm^2$, 100 $cm^2$, 125 $cm^2$, 150 $cm^2$, 200 $cm^2$, 250 $cm^2$, 300 $cm^2$, 400 $cm^2$, 500 $cm^2$, 600 $cm^2$, 700 $cm^2$, 800 $cm^2$ or 1000 $cm^2$ in size, or any range of values therebetween.

Method

A method of manufacturing a multilayer glass stack is also described. In some embodiments, an external-facing glass layer is formed. In some embodiments, an internal-facing glass layer is formed. In some embodiments, an adhesive interlayer is formed. In some embodiments, the adhesive interlayer is positioned between the external-facing and internal-facing glass layers to form a multilayer glass stack.

EXAMPLES

The performances of multilayered glass stacks with varying glass compositions are empirically measured using a diamond drop test, where a weighted diamond is dropped from different heights to calculate the impact energy to failure. Results of these measurements are shown below.

Example 1

Figure 4:
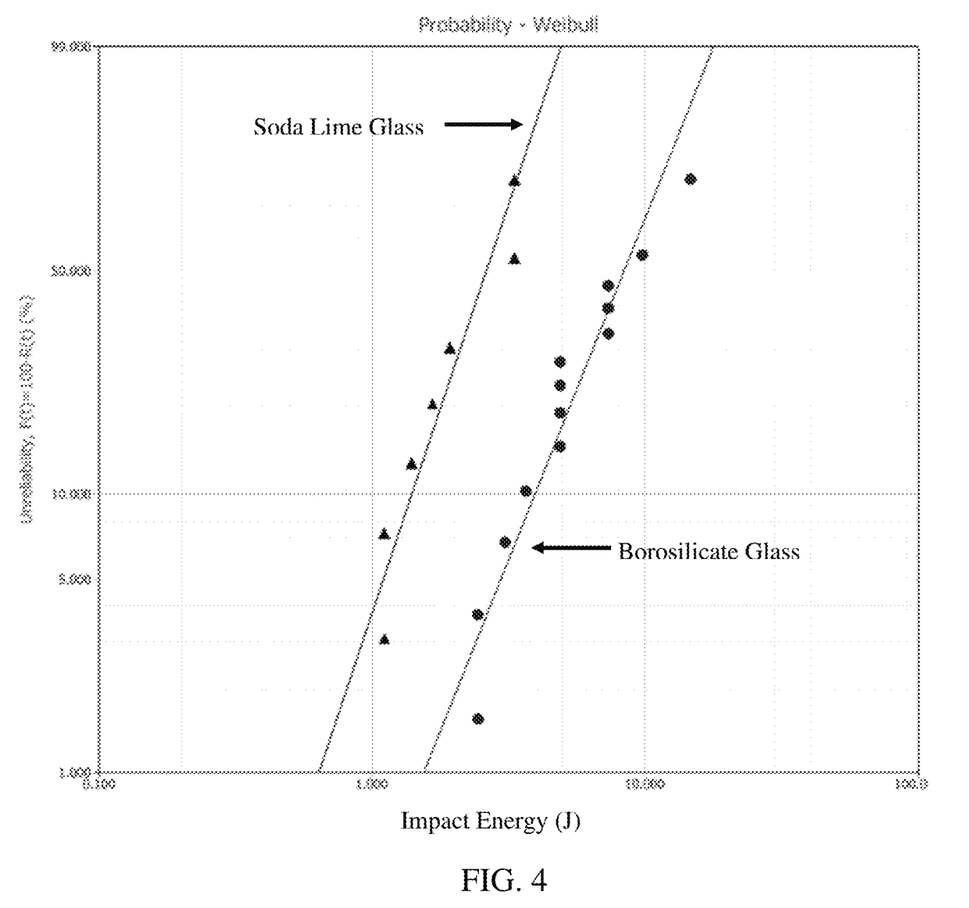
FIG. 4 is a line chart providing impact reliability data of multilayer glass stacks with different external-facing glass layer materials of soda lime glass or borosilicate glass. The X-axis is impact energy (J) and the Y-axis is unreliability of the glass.

FIG. 4 is a line graph showing the difference in unreliability between multilayer glass stacks comprising borosilicate glass (circular markers) and soda lime glass (triangular markers) of approximately the same thickness (3.3 mm and 3.2 mm respectively) used as the external-facing glass layer. FIG. 4 shows that the soda lime stack has a 10% chance of failure when struck by a projectile with 1.4 J of impact energy while the borosilicate stack has the same 10% chance of failure when struck by a projectile with much higher impact energy at 3.9 J. Thus, the glass stack with an outer borosilicate glass layer was able to withstand a greater projectile strike than the glass stack with the soda lime outer glass layer.

Example 2: Internal-Facing Glass Layer

Figure 5:
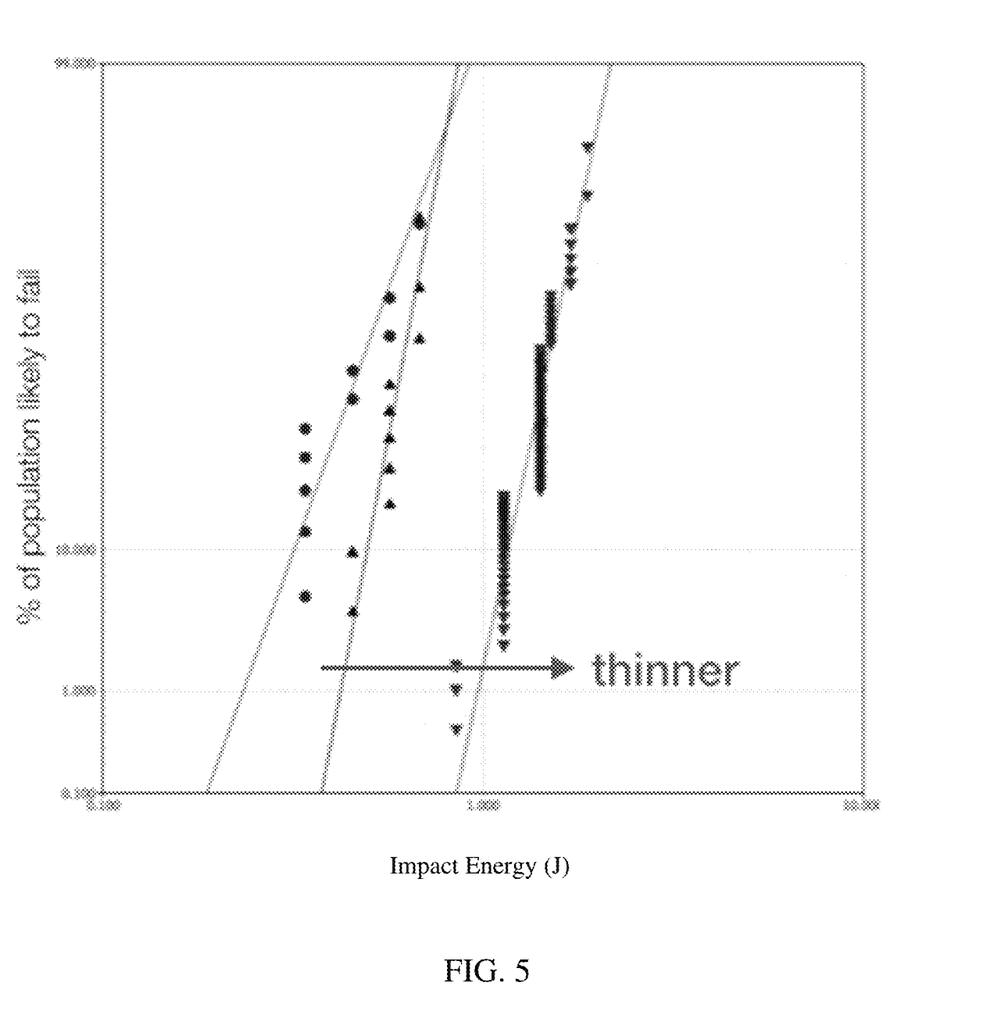
FIG. 5 is a line chart providing impact reliability data of multilayer glass stacks with varying internal-facing glass layer thicknesses. The X-axis is impact energy (J) and the Y-axis is the percentage of the population of tested materials that is likely to fail.

FIG. 5 is a line graph showing the difference in unreliability between multilayer glass stacks comprising different thicknesses of the internal-facing glass layer on impact performance. FIG. 5 demonstrates that multilayer glass stacks with thinner internal-facing glass layers yield improved performances when struck by projectiles. Thus, glass stacks with thinner internal-facing glass layers were able to withstand a greater projectile strike than the glass stacks with thicker internal-facing glass layers.

Example 3: Adhesive Interlayer

Figure 6:
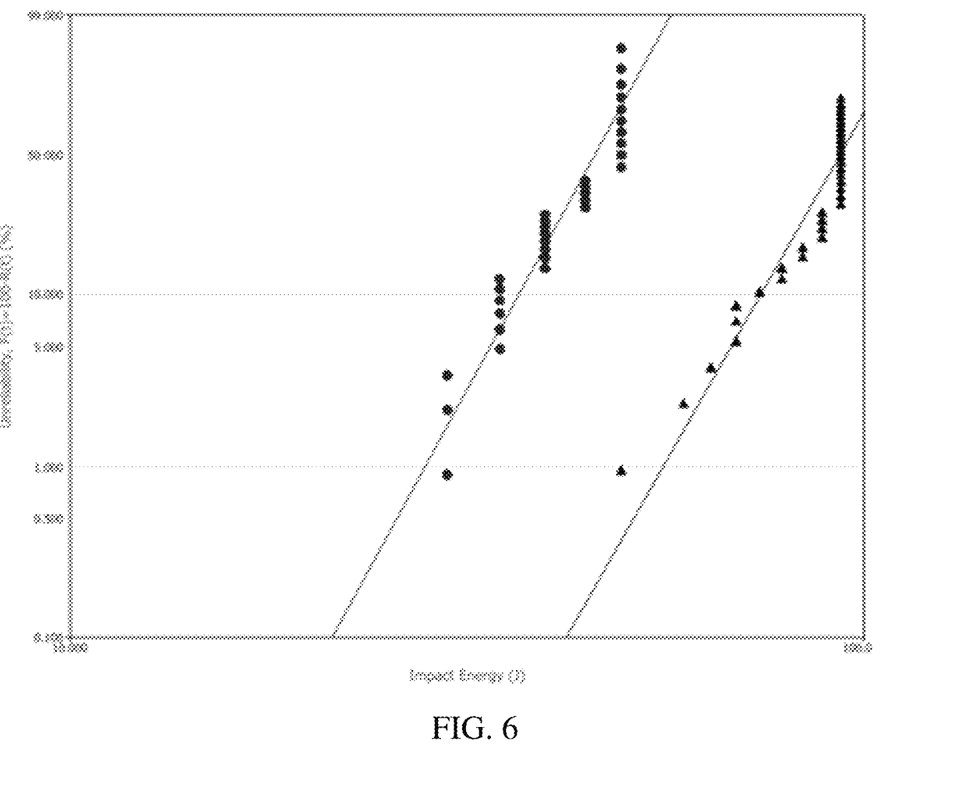
FIG. 6 is a line chart providing impact reliability data of multilayer glass stacks including adhesive interlayers with varying glass transition temperatures (Tg) and energy absorption properties. The X-axis is impact energy (J) and the Y-axis is unreliability of the glass.

FIG. 6 is a line graph showing the difference in unreliability between multilayer glass stacks comprising different adhesive interlayers with varying Tg and energy absorption properties. FIG. 6 demonstrates that that multilayer glass stacks including adhesive interlayers with lower Tg and higher absorption properties yield improved performances when struck by projectiles. Thus, the glass stack with an adhesive interlayer with a lower Tg and higher absorption properties was able to withstand a greater projectile strike than the glass stacks with an adhesive interlayer with a higher Tg and lower absorption properties.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, while others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The headings contained in this document, if any, are for convenience only and do not necessarily affect the scope or meaning of the devices and methods disclosed herein.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A multilayer glass stack for a vehicle windshield, comprising:
   an external-facing glass layer comprising borosilicate;
   a borosilicate glass interlayer;
   an internal-facing glass layer;
   a first adhesive interlayer positioned between the external-facing glass-layer and the borosilicate glass interlayer, and a second adhesive interlayer positioned between the borosilicate glass interlayer and the internal-facing glass layers, wherein at least the first the adhesive interlayer comprises a decoration printed upon the first adhesive interlayer, and wherein the first adhesive interlayer is continuous; and
   a viewing area comprising an optical distortion of less than 250 millidiopters;
   wherein a thickness ratio of the external-facing glass layer to the internal-facing glass layer is between 8:1 and less than 40:1;
   wherein the multilayer glass stack is a vehicle windshield and is shaped to fit into a vehicle windshield frame; and
   wherein edges of the glass and adhesive layers all overlap.

2. The multilayer glass stack of claim 1, wherein the multilayer glass stack has an area density of 7.5 kg/m² to 10 kg/m².

3. The multilayer glass stack of claim 1, wherein the multilayer glass stack has at most a 10% chance of failure with an impact of 2 J.

4. The multilayer glass stack of claim 1, wherein the external-facing glass layer has at most a 10% chance of failure with an impact of 2 J.

5. The multilayer glass stack of claim 1, wherein the external-facing glass layer has a thickness of 2 mm to 5 mm.

6. The multilayer glass stack of claim 1, wherein the internal-facing glass layer comprises a material selected from the group consisting of aluminosilicate, tempered glass, and combinations thereof.

7. The multilayer glass stack of claim 1, wherein the internal-facing glass layer has a thickness of 0.5 mm to 1.1 mm.

8. The multilayer glass stack of claim 1, wherein the thickness ratio of the external-facing glass layer to the internal-facing glass layer is greater than 8:1 and less that 10:1.

9. The multilayer glass stack of claim 1, wherein the adhesive interlayer has a glass transition temperature of 6° C. to 10° C.

10. The multilayer glass stack of claim 1, wherein the first and second adhesive interlayers comprise a polyvinyl ether (PVE).

11. The multilayer glass stack of claim 1, further comprising at least one additional layer, wherein the at least one additional layer is selected from the group consisting of a light absorbing layer, a light reflecting layer, an acoustic dampening layer, and combinations thereof.

12. The multilayer glass stack of claim 11, wherein the at least one additional layer comprises a light absorbing layer, and the light absorbing layer comprises a tint material.

13. The multilayer glass stack of claim 1, further comprising an element selected from the group consisting of a camera, a sensor, a heating element, a waveguide, an incoupling optical element, an outcoupling optical element, a light injection device, and combinations thereof.

14. The multilayer glass stack of claim 1, wherein the vehicle windshield has a curvilinear shape.

15. The multilayer glass stack of claim 1, wherein the vehicle windshield is configured to break into pieces of a size that complies with a governmental safety guideline.

16. The multilayer glass stack of claim 1, further comprising a camera positioned facing the internal-facing glass layer of the multilayer glass stack.

17. The multilayer glass stack of claim 16, wherein the camera is positioned to view through the viewing area.

18. The multilayer glass stack of claim 1, wherein the adhesive interlayer consists essentially of the adhesive.

19. A vehicle comprising a vehicle frame and the multilayer glass stack of claim 1.

20. A method of manufacturing a multilayer glass stack, comprising:
   adhering an external-facing glass layer to a borosilicate glass interlayer with a first adhesive interlayer, and the borosilicate glass interlayer with an internal-facing glass layer with a second adhesive interlayer to form the multilayer glass stack;
   wherein the first adhesive interlayer is continuous and includes a printed decoration;
   wherein edges of the glass and adhesive layers all overlap; and
   wherein the multilayer glass stack comprises a viewing area comprising an optical distortion of less than 250 millidiopters, and wherein a thickness ratio of the external-facing glass layer to the internal-facing glass layer is between 8:1 and 40:1.

21. The method of claim 20, further comprising shaping the multilayer glass stack to fit into a vehicle windshield frame, wherein the multilayer glass stack is a vehicle windshield.

22. The method of claim 20, wherein the vehicle windshield is shaped to comprise a curvilinear shape.

23. The method of claim 20, wherein the multilayer glass stack has at most a 10% chance of failure with an impact of 2 J.

24. The method of claim 20, further comprising positioning the multilayer glass stack into a vehicle frame of a vehicle.

25. The method of claim 20, further comprising positioning a camera to face the internal-facing glass layer of the multilayer glass stack.

26. The method of claim 25, wherein the camera is positioned to view through the viewing area.

* * * * *

UNITED STATES PATENT AND TRADEMARK OFFICE
CERTIFICATE OF CORRECTION

PATENT NO. : 12,343,960 B2
APPLICATION NO. : 18/477373
DATED : July 1, 2025
INVENTOR(S) : Mottsmith et al.

Page 1 of 1

It is certified that error appears in the above-identified patent and that said Letters Patent is hereby corrected as shown below:

On the Title Page

In Column 1, under Item (63) "Related U.S. Application Data", Line 1, delete "(60)" and insert --(63)-- therefor In the Claims In Column 13, Line 42, in Claim 1, delete "glass-layer" and insert --glass layer-- therefor In Column 13, Line 45, in Claim 1, after "first", delete "the"

Signed and Sealed this
Sixth Day of January, 2026

John A. Squires
*Director of the United States Patent and Trademark Office*